United States Patent
Matsuki

(10) Patent No.: US 7,961,414 B2
(45) Date of Patent: Jun. 14, 2011

(54) MAGNETIC COUPLING LENS DRIVING ACTUATOR

(75) Inventor: Kaoru Matsuki, Kawasaki (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 12/753,212

(22) Filed: Apr. 2, 2010

(65) Prior Publication Data
US 2010/0254032 A1 Oct. 7, 2010

(30) Foreign Application Priority Data
Apr. 6, 2009 (JP) .................................. 2009-091860

(51) Int. Cl.
*G02B 7/02* (2006.01)
(52) U.S. Cl. .......................... 359/824; 359/819; 359/822
(58) Field of Classification Search .................. 359/824, 359/819, 821, 822, 823, 826
See application file for complete search history.

(56) References Cited

U.S. PATENT DOCUMENTS
7,511,905 B2 3/2009 Matsuki et al.
7,667,906 B2 * 2/2010 Tsai .............................. 359/824

FOREIGN PATENT DOCUMENTS
JP 2008-194326 8/2008

* cited by examiner

*Primary Examiner* — Timothy J Thompson
(74) *Attorney, Agent, or Firm* — Scully, Scott, Murphy & Presser, P.C.

(57) ABSTRACT

A magnetic coupling lens driving actuator includes an imaging element; a movable lens that is movable in a direction of an optic axis; a magnetic body that is coupled to the movable lens; a lens tube that encases and airtightly seals the imaging element, the movable lens, and the magnetic body; a magnetic field producing unit that is disposed on an outer surface of the lens tube and that is movable in the direction of the optic axis; and a wire member that has one end thereof attached to the magnetic field producing unit, and that is operative to move the magnetic field producing unit in the direction of the optic axis. The magnetic field producing unit includes two magnetic field producing members disposed with a predetermined gap therebetween in the direction of the optic axis, the magnetic body is disposed opposed to the predetermined gap within the lens tube, and the movable lens is moved by any one of deformation and movement of the wire member.

7 Claims, 4 Drawing Sheets

MAGNETIC COUPLING LENS DRIVING ACTUATOR

CROSS-REFERENCE TO RELATED APPLICATIONS

The present application is based upon and claims the benefit of priority from the prior Japanese Patent Application No. 2009-091860 filed on Apr. 6, 2009; the entire contents of which are incorporated herein by reference.

BACKGROUND OF THE INVENTION

1. Field of the Invention

The present invention relates to a magnetic coupling lens driving actuator.

2. Description of the Related Art

Conventionally, to bring in full play the focusing and zooming functions of an optical system in an endoscope, it was necessary to provide a mechanism to move a lens within the lens tube of the endoscope in the direction of an optic axis. An actuator is generally used to move the lens within the lens tube. The amount of displacement achievable with a typical actuator depends on the length of the actuator. To achieve a longer displacement, a longer actuator is required. However, an actuator that can be installed in a rigid section provided at the end of the endoscope cannot provide the desirable longer displacement. Consequently, the freedom in designing of optical system in an endoscope was restricted.

An example of a structure that can solve the above-mentioned problem, a magnetic coupling actuator has been disclosed in Japanese Patent Application Laid-Open No. 2008-194326.

FIG. 3 is a cross-sectional view of a structure of a conventional magnetic coupling actuator. In the conventional magnetic coupling actuator, a lens holder 903 that holds a lens 902 is made of magnetic material. Moreover, the lens holder 903, along with the lens 902, is encased inside a lens tube 904. The lens holder 903 is movable in the direction of an optic axis 900. Focusing and zooming is achieved by moving the lens 902 in the direction of the optic axis 900.

On an outer surface of the lens tube 904 is provided a permanent magnet 905 so as to oppose the lens holder 903. The lens holder 903 and the permanent magnet 905 are mutually magnetically coupled via the lens tube 904. A shape memory alloy wire 906 is connected to one side of the permanent magnet 905. The permanent magnet 905 moves in a direction that is parallel to the optic axis 900 with the expansion and contraction of the shape memory alloy wire 906.

Following the movement of the permanent magnet 905, the lens holder 903, which is magnetically coupled to the permanent magnet 905, moves in the direction of the optic axis 900. The shape memory alloy wire 906 is encased within a bendable tube 908. Because the tube 908 and the shape memory alloy wire 906 are bendable, they can be encased within a bendable section of the endoscope. Consequently, it is possible to relax the restrictions on the length of the shape memory alloy wire 906. Moreover, it is possible to use the shape memory alloy wire 906 of a length that can produce the amount of displacement that is sufficient for moving the lens 902.

As shown in FIG. 4, in order to move the lens holder 903 by using the permanent magnet 905 (attractive force F (horizontal component Fh and vertical component Fv)), the permanent magnet 905 must be first moved to a position where the horizontal component Fh of the attractive force (adsorption force) F and a static frictional force Fs of the permanent magnet 905 are counter balanced, and then subsequently moved further. Consequently, the shape memory alloy wire 906 must be expanded/contracted more than the desired amount of displacement of the lens 902. FIG. 4 is a cross-sectional view of the conventional magnetic coupling actuator for explaining the working principle of the conventional magnetic coupling actuator.

SUMMARY OF THE INVENTION

The present invention has been made in view of the above discussion. It is an object of the present invention to enhance the durability of the shape memory alloy wire. This is achieved by reducing the amount of expansion/contraction of the shape memory alloy wire, i.e., by making equal the amount of movement of the lens and the amount of expansion/contraction of the shape memory alloy wire.

To solve the above problems and to achieve the above objects, a magnetic coupling lens driving actuator according to an aspect of the present invention includes an imaging element; a movable lens that is movable in a direction of an optic axis; a magnetic body that is coupled to the movable lens; a lens tube that encases and airtightly seals the imaging element, the movable lens, and the magnetic body; a magnetic field producing unit that is disposed on an outer surface of the lens tube and that is movable in the direction of the optic axis; and a wire member that has one end thereof attached to the magnetic field producing unit, and that is operative to move the magnetic field producing unit in the direction of the optic axis. The magnetic field producing unit includes two magnetic field producing members disposed with a predetermined gap therebetween in the direction of the optic axis, the magnetic body is disposed opposed to the predetermined gap within the lens tube, and the movable lens is moved by any one of deformation and movement of the wire member.

In the magnetic coupling lens driving actuator according to another aspect of the present invention, it is preferable that the magnetic field producing members are permanent magnets.

In the magnetic coupling lens driving actuator according to still another aspect of the present invention, it is preferable that the predetermined gap has a width that is equal to a width of the magnetic body in the direction of the optic axis.

In the magnetic coupling lens driving actuator according to still another aspect of the present invention, it is preferable that a first position regulating member and a second position regulating member be arranged inside the lens tube, and that the first position regulating member and the second position regulating member mechanically limit displacement of the movable lens.

In the magnetic coupling lens driving actuator according to still another aspect of the present invention, it is preferable that the wire member is a shape memory alloy wire.

In the magnetic coupling lens driving actuator according to still another aspect of the present invention, it is preferable that the magnetic coupling lens driving actuator further includes a bendable tube member, having a first end and a second end, and that encases the shape memory alloy wire, wherein the first end of the tube is secured to the lens tube, the second end of the tube is secured to an end of the shape memory alloy wire that is not attached to the magnetic field producing unit; and a driving mechanism configured by expansion/contraction of the shape memory alloy wire that causes relative displacement in positions of the magnetic field producing unit and the first end of the tube member.

In the magnetic coupling lens driving actuator according to still another aspect of the present invention, it is preferable that the driving mechanism includes a biasing elastic body that exerts a force in a direction opposite to the direction in which the relative positions of the magnetic field producing unit and the first end of the tube member are displaced by the expansion and contraction of the shape memory alloy wire.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of a magnetic coupling lens driving actuator according to the present invention will be described below in detail with reference to the accompanying drawings. The present invention is by no means limited to the embodiments explained below.

First Embodiment

Figure 1:
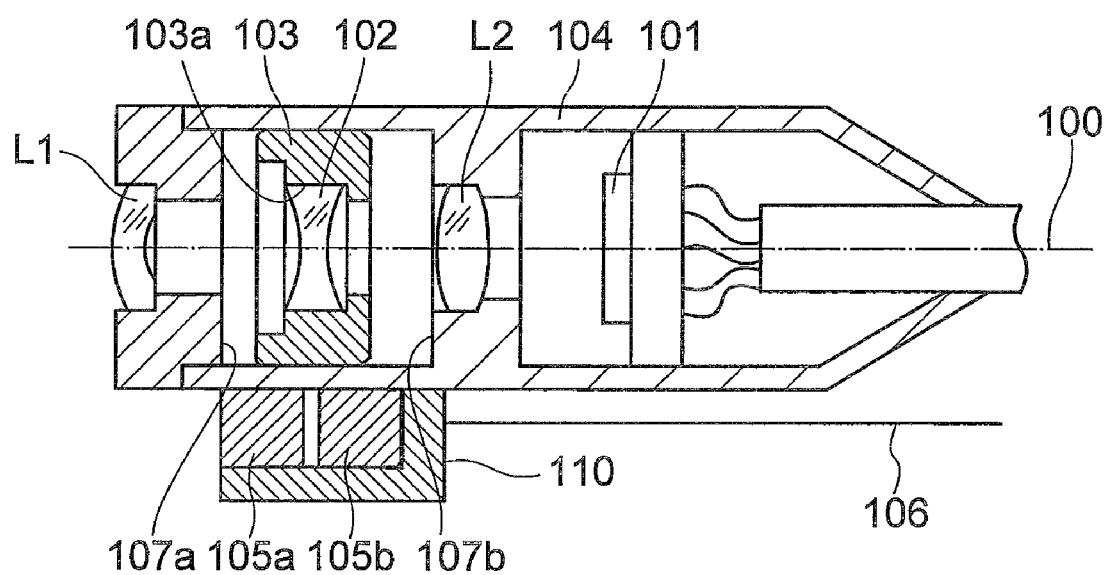
FIG. 1 is a cross-sectional view of a structure of a magnetic coupling lens driving actuator according to a first embodiment of the present invention.

FIG. 1 is a cross-sectional view of a structure of a magnetic coupling lens driving actuator according to a first embodiment of the present invention.

In the magnetic coupling lens driving actuator according to the first embodiment, a lens holder 103 that holds a lens 102 (movable lens) is made of magnetic material (such as iron or stainless steel). The lens holder 103 is encased inside a lens tube 104. The lens holder 103 is arranged in such a manner that it can move in the direction of an optic axis 100 while securing an internal space 103a for holding the lens 102. Focusing and zooming is performed by moving the lens 102 along with the lens holder 103 in the direction of the optic axis 100. The incident light is converted into electrical signal in an imaging element 101.

On an outer surface of the lens tube 104 are provided two pieces of permanent magnets 105a and 105b (magnetic field producing members) in this order along the direction of the optic axis 100. The lens holder 103 and the permanent magnets 105a and 105b are mutually magnetically coupled via the lens tube 104. The permanent magnets 105a and 105b are arranged with a predetermined gap therebetween. Moreover, the permanent magnets 105a and 105b are arranged in such a manner that the magnetic flux acting on the movable member is maximized with respect to the direction of movement of the movable body. A wire 106 (wire member) is connected to the permanent magnets 105a and 105b via a magnet holding member 110. The lens holder 103 is arranged at a position that opposes the predetermined gap between the permanent magnets 105a and 105b. The predetermined gap between the permanent magnets 105a and 105b is set based on a relationship between a horizontal component of an attractive force and a static frictional force of the magnet. It is preferable that a width of this gap is equal to the width of the lens holder 103 in the direction of the optic axis 100; because, when the gap is set in this manner, the lens holder 103 moves without delay with the movement of the permanent magnets 105a and 105b.

The wire 106 extends in a direction parallel to the optic axis 100. The permanent magnets 105a and 105b can be moved in the direction parallel to the optic axis 100 by pulling or pushing the wire 106 from the outside. When the permanent magnets 105a and 105b move because of the pulling/pushing of the wire 106, the lens holder 103, which is magnetically coupled to the permanent magnets 105a and 105b, also moves inside the lens tube 104. In other words, the lens holder 103 can be moved inside the lens tube 104 by operating the wire 106.

A shape memory alloy wire that can be expanded/contracted by employing Joule heating is used as the wire 106. Use of the shape memory alloy wire as the wire 106 allows the permanent magnet 105 to be moved by simply performing an operation of passing an electric current through the wire 106 from the outside and this method has better operativity than the method of mechanically pulling/pushing the wire 106 from the outside. In other words, the lens holder 103 can be moved inside the lens tube 104 by causing deformation of the wire 106.

The permanent magnet 105a serves to move the lens 102 toward the left side on the paper surface in FIG. 1. On the other hand, the permanent magnet 105b serves to move the lens 102 toward the right side on the paper surface in FIG. 1. By virtue of this structure, an amount of movement of an actuator can be set smaller with respect to an amount of movement of the lens 102 as compared to the conventional technique. This leads to a reduction in the load on the wire 106 so that a prolonged durability for the wire 106 can be ensured. Attention is drawn to the fact that the lens holder 103 could be made of a permanent magnet instead of making it of a magnetic material.

Figure 3:
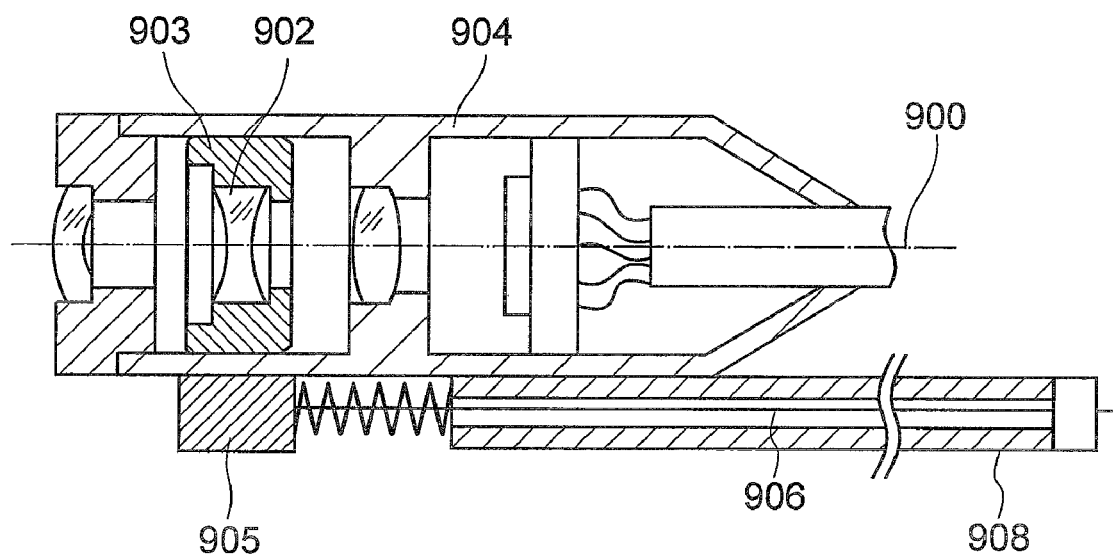
FIG. 3 is a cross-sectional view of a structure of a conventional magnetic coupling actuator.
Figure 4:
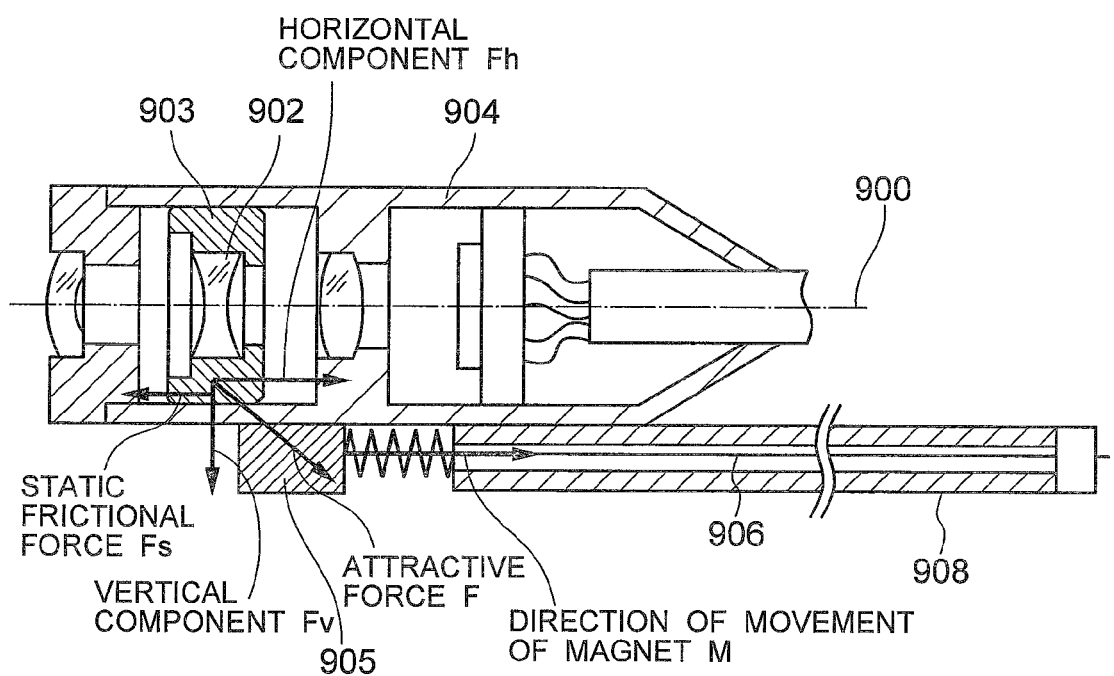
FIG. 4 is a cross-sectional view of the conventional magnetic coupling actuator for explaining the working principle of the conventional magnetic coupling actuator.

In the conventional technology shown in FIGS. 3 and 4, to move the lens 902 in a direction parallel to the optic axis 900, the wire 906 is pushed/pulled in a state where the lens holder 903 and the permanent magnet 905 are mutually coupled via a coupling member. Accordingly, it is necessary to provide a hole and a groove in the lens tube 904 to mutually couple the lens holder 903 and the permanent magnet 905, therefore an airtight sealing of the lens tube 904 is difficult to achieve.

On the contrary, in the magnetic coupling lens driving actuator according to the first embodiment, the lens holder 103 and the permanent magnet 105 are magnetically coupled via the lens tube 104. Therefore, there is no need to provide a hole or a groove in the lens tube 104 for coupling purposes. Therefore, in the structure of the first embodiment, airtight sealing of the lens tube 104 with the lens 102 and other lenses L1 and L2 encased therewithin can be achieved. Consequently, durability of the optical system against environment is improved, and the optical system is not damaged even when exposed to high temperature, high pressure, high humidity, etc.

Moreover, in the magnetic coupling lens driving actuator according to the first embodiment, although the amount of movements of the permanent magnets 105a and 105b are not particularly regulated, the movement of the lens 102 is regulated by regulating members 107a and 107b (a first position regulating member and a second position regulating member, respectively). Because the movement of the lens 102 is limited by the regulating members, the positions of the permanent magnets 105a and 105b in the direction of the optic axis 100 need not be determined accurately. In the first embodiment, the regulating members 107a and 107b are assumed to be projecting structures provided inside the lens tube 104. However, the regulating members can have other structure as long as it can regulate the movement of the lens 102.

As explained above, in the magnetic coupling lens driving actuator according to the first embodiment, the lens holder 103, which serves as a first magnetic body, and the permanent magnets 105a and 105b, which serve as a magnetic field producing unit, are placed on either side of the wall of the lens tube 104, and are mutually magnetically coupled. The permanent magnets 105a and 105b are moved by the wire 106 being mechanically pulled/pushed or by causing deformation of the wire 106. Because of the movement of the permanent magnets 105a and 105b, the lens holder 103, which is magnetically coupled to the permanent magnets 105a and 105b, and the lens 102, which is supported by the lens holder 103, are caused to move.

By providing two permanent magnets 105a and 105b in the direction of the optic axis 100, the amount of movement of the wire 106 and the amount of movement of the magnetic body can be made equal.

Furthermore, the use of the permanent magnets 105a and 105b as the magnetic field producing unit obviates the need for providing wiring required when an electromagnet(s) is used. Consequently, advantages that assembly becomes easy, structure becomes simple, etc., can be achieved.

By providing a predetermined gap between the permanent magnets 105a and 105b the same as the width of the lens holder 103, which serves as the magnetic body, in the direction of the optic axis 100, efficiency of movement can be enhanced.

Furthermore, the imaging element 101 and the lens holder 103 are airtightly sealed inside the lens tube 104 and a sealing member that encases the lens tube 104 from the outside. Thus, the durability of the optical system against the environment can be improved.

Furthermore, the regulating members 107a and 107b are provided inside the lens tube 104 as the first position regulating member and the second position regulating member, respectively. The regulating members 107a and 107b mechanically limit the displacement of the lens 102. By providing projections on the side of the lens 102, positioning of the lens 102 can be performed regardless of the precision of movement of the permanent magnets 105a and 105b that collectively serve as a second magnetic body.

Moreover, by using a shape memory alloy wire as the wire 106, the lens 102 can be moved with a weaker driving force compared to when the wire has to be mechanically pulled or pushed from the outside. This structure leads to enhancement in the operation of the wire 106.

Second Embodiment

Figure 2:
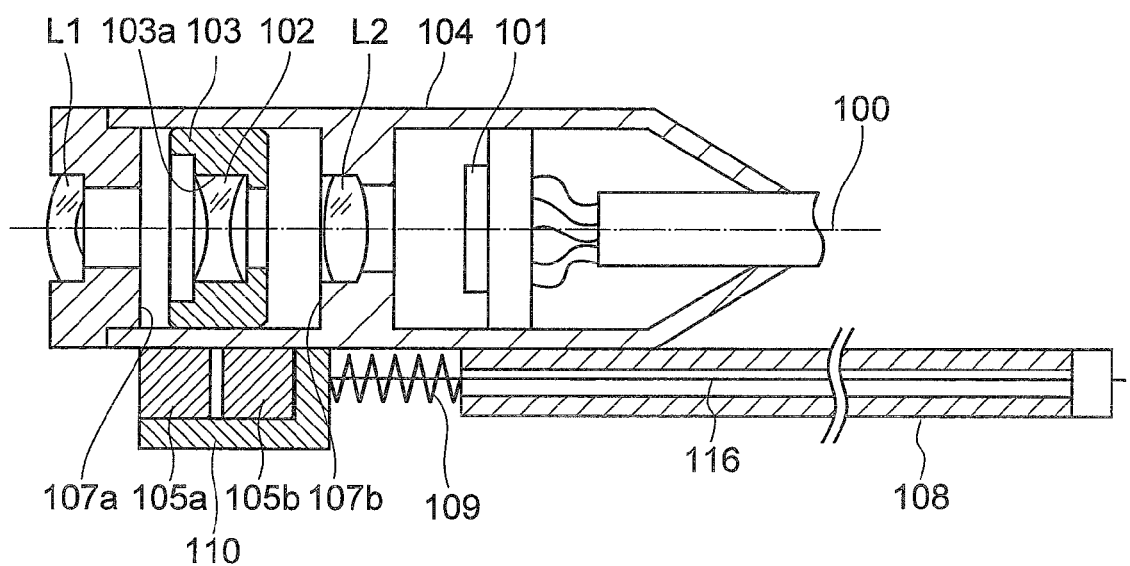
FIG. 2 is a cross-sectional view of a structure of a magnetic coupling lens driving actuator according to a second embodiment of the present invention.

FIG. 2 is a cross-sectional view of a structure of a magnetic coupling lens driving actuator according to a second embodiment of the present invention. The structural elements in the second embodiment that are identical to those in the first embodiment have been assigned the same reference numerals or reference symbols, as the case may be.

The magnetic coupling lens driving actuator according to the second embodiment includes a bendable tube 108 (tube member) that encases therewithin a shape memory alloy wire 116 (wire member). One end of the tube 108 is secured to the lens tube 104. The shape memory alloy wire 116 is passed through the lens tube 104 from its free end and comes out from the fixed end. The end of the shape memory alloy wire 116 that comes out from the fixed end of the tube 108 is attached to the permanent magnets 105a and 105b and the other end of the shape memory alloy wire 116 is connected to the fixed end of the tube 108.

A biasing spring 109 (biasing elastic member) that exerts a force in a direction opposite to the direction of movement of the permanent magnets 105a and 105b is provided between the permanent magnets 105a and 105b, and the end of the tube 108 that is secured to the lens tube 104. Any other structure, such as a rubber member, can be used as the biasing elastic member as long as it exerts a force in the direction opposite to the direction of movement of the permanent magnets 105a and 105b.

By attaching the free end of the tube 108 to one end of the shape memory alloy wire 116, the actuator itself can be lengthened and made supple. As a result, not only can a substantial amount of movement of the lens 102 be achieved, the actuator can be encased inside a bendable member. As the amount of expansion/contraction of the shape-memory alloy wire 116 depends on the length of the shape memory alloy wire 116, in the second embodiment, it is possible to use a longer shape memory alloy wire 116 thereby increasing the amount of movement of the lens 102.

In the magnetic coupling lens driving actuator according to the second embodiment, when the shape memory alloy wire 116 is heated by the Joule heating, the shape memory alloy wire 116 contracts so that the permanent magnets 105a and 105b move to the side of the imaging element 101. The biasing spring 109, which exerts a force in the direction opposite to the movement direction of the permanent magnets 105a and 105b, is placed between the permanent magnets 105a and 105b, and the tube 108. The above structure serves to speed-up the expansion of the shape memory alloy wire 116 due to the action of the biasing spring after the Joule heating is stopped.

When the above-described structure is employed, expansion/contraction of the shape memory alloy wire 116 functions as a driving mechanism that causes displacement in the relative positions of the permanent magnets 105a and 105b, which serve as the magnetic field producing unit, and the one end of the tube 108, which serves as the tube member, that is secured to the lens tube 104. This structure also enables the shape memory alloy wire 116 to be encased inside a bendable member of the endoscope, and enables increased displacement of the magnetic field producing unit.

Furthermore, the placement of the biasing spring 109 between the permanent magnets 105a and 105b and the tube 108 speeds-up restoring of the shape memory alloy wire 116 to its original length after the Joule heating is stopped.

The structure, operation, and advantages of the second embodiment other than those described above are identical to those of the first embodiment.

As described above, the magnetic coupling lens driving actuator according to the present invention can be used in an endoscope requiring an optical system that brings functions such as focusing and zooming into full play.

In the magnetic coupling lens driving actuator according to the present invention, the amount of movement of the lens and the amount of expansion/contraction of the shape memory alloy wire are made equal, i.e., the amount of expansion/contraction of the shape memory alloy wire is reduced. As a result, the durability of the shape memory alloy wire is enhanced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A magnetic coupling lens driving actuator comprising:
   an imaging element;
   a movable lens that is movable in a direction of an optic axis;
   a magnetic body that is coupled to the movable lens;
   a lens tube that encases and airtightly seals the imaging element, the movable lens, and the magnetic body;
   a magnetic field producing unit that is disposed on an outer surface of the lens tube and that is movable in the direction of the optic axis; and
   a wire member that has one end thereof attached to the magnetic field producing unit, and that is operative to move the magnetic field producing unit in the direction of the optic axis,
   wherein the magnetic field producing unit includes two magnetic field producing members disposed with a predetermined gap therebetween in the direction of the optic axis, the magnetic body is disposed opposed to the predetermined gap within the lens tube, and the movable lens is moved by any one of deformation and movement of the wire member.

2. The magnetic coupling lens driving actuator according to claim 1, wherein the magnetic field producing members are permanent magnets.

3. The magnetic coupling lens driving actuator according to claim 1, wherein the predetermined gap has a width that is equal to a width of the magnetic body in the direction of the optic axis.

4. The magnetic coupling lens driving actuator according to claim 1, further comprising a first position regulating member and a second position regulating member arranged inside the lens tube, and the first position regulating member and the second position regulating member mechanically limit displacement of the movable lens.

5. The magnetic coupling lens driving actuator according to claim 1, wherein the wire member is a shape memory alloy wire.

6. The magnetic coupling lens driving actuator according to claim 5, further comprising:
   a bendable tube member, having a first end and a second end, and that encases the shape memory alloy wire, wherein the first end of the tube member is secured to the lens tube, the second end of the tube member is secured to an end of the shape memory alloy wire that is not attached to the magnetic field producing unit; and
   a driving mechanism configured by expansion/contraction of the shape memory alloy wire that causes relative displacement in positions of the magnetic field producing unit and the first end of the tube member.

7. The magnetic coupling lens driving actuator according to claim 6, wherein the driving mechanism includes a biasing elastic body that exerts a force in a direction opposite to the direction in which the relative positions of the magnetic field producing unit and the first end of the tube member are displaced by the expansion and contraction of the shape memory alloy wire.

* * * * *